United States Patent Office 3,501,454
Patented Mar. 17, 1970

3,501,454
AZO DYESTUFFS CONTAINING A
TRIAZOLE GROUP
Horst Nickel and Fritz Suckfull, Leverkusen, Germany, assignors to Farbenfabriken Bayer Aktiengesellschaft, Leverkusen, Germany, a corporation of Germany
No Drawing. Filed Aug. 8, 1966, Ser. No. 570,716
Claims priority, application Germany, Aug. 13, 1965,
F 46,887
Int. Cl. C09b 39/04, 62/08; D06p 3/60
U.S. Cl. 260—157                         8 Claims

ABSTRACT OF THE DISCLOSURE

Dyestuffs of the formula:

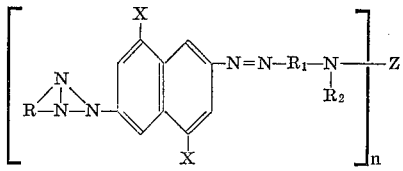

wherein R is an ortho-divalent benzene or naphthalene or sulphonic acid substituted benzene or naphthalene radical; $R_1$ is a paradivalent substituted or unsubstituted benzene or naphthalene radical; $R_2$ is hydrogen or methyl; X is hydrogen or sulphonic acid at least one being sulphonic acid; n is 1 or 2 and Z is a mono- or divalent acyl radical are prepared by condensing the amino dyestuff corresponding to the bracketed portion of the structure with a mono- or di-functional acylating agent (e.g. cyanuric chloride, phosgene).

---

The present invention relates to valuable new azo dyestuffs of the formula

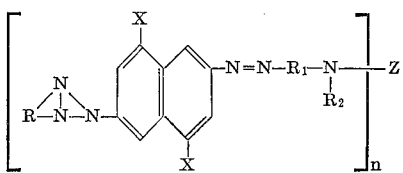

(I)

In this formula, R means an aromatic or heterocyclic radical, preferably one of the naphthalene or benzene series in which the nitrogen atoms of the triazole group stand in the o-position to each other, $R_1$ represents an aromatic radical which is free of hydroxyl groups and is preferably a radical of the benzene or naphthalene series, in which the azo group and —$N(R_2)$— are in the p-position to each other, $R_2$ is hydrogen or a substituent, preferably a lower alkyl radical containing 1 to 3 carbon atoms, one X is a sulphonic acid radical, the other X is hydrogen or a sulphonic acid radical, Z means an acyl radical, and n is a whole number, preferably a number from 1 to 3.

The new dyestuffs are preferably obtained by condensing azo dyestuffs of the formula:

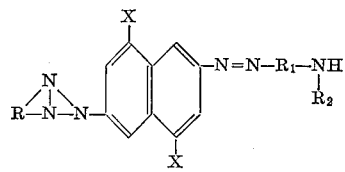

(II)

wherein R, $R_1$, $R_2$ and the radicals X have the same meaning as above, with mono- or polyfunctional acylating agents.

Monoazo dyestucs (II) may be obtained, for example, according to the instructions of German patent specification No. 1,079,760.

The condensation of the monoazo dyestuffs (II) with acylating agents to give the new azo dyestuffs (I) is preferably carried out in an aqueous or organic/aqueous medium. It can be advantageous to add the acylating agent dissolved in an organic solvent, such as toluene or acetone. Suitable acylating agents are aliphatic, aromatic or heterocyclic mono- and polyfunctional compounds. Examples of monofunctional acylating agents are the following: acetic anhydride, acetyl chloride, propionyl chloride, maleic anhydride, benzoyl chloride and its derivatives further substituted in the nucleus, phenyl isocyanates and benzene-sulphonyl halides and their substitution products. If the acylating component itself contains an amino group only potentially to be set free, then this amino group can again be acylated. When, for example, 4-nitrobenzoyl chloride or alkyl derivatives are used as monofunctional acylating agent, the nitro group can thus be converted, subsequent to the first acylating reaction, into an amino group by reduction, e.g. with sodium sulphide, and the amino group can then be condensed with a further mono- or polyfunctional acylating agent. In this way, dyestuffs of the following general formula are obtained:

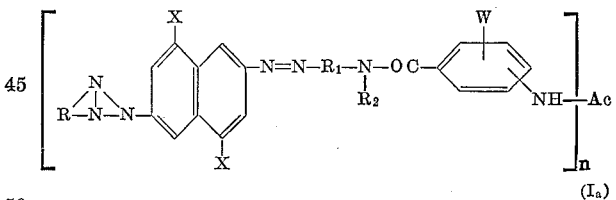

(I_a)

in which R, $R_1$, $R_2$, X and n have the same meaning as above, W stands for hydrogen or a substituent, e.g. a lower alkyl group, and Ac represents an acyl radical.

In dyestuffs of this formula, the radical:

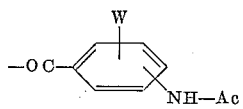

as a whole is to be regarded as an acyl radical Z in accordance with the definition given to Formula I.

So-called reactive components, i.e. acylating agents in which, after the acylation reaction, there remain labile substituents or atoms can also be employed as acylating agents, e.g. 2,3 - dichloro - quinoxaline - 6 - carboxylic acid halides or -sulphonic acid halides, halofatty acid halides, such as β-chloro- or β,β-dichloropropionic acid halides, derivatives of unsaturated aliphatic carboxylic or sulphonic acids, such as acrylic and methacrylic acid halides or mono-, di- or trichloroacrylic acid halides and vinyl-sulphonic acid halides, 1-(sulpho- or carboxy-aryl or -alkyl)-4,5-dihalo-6-pyridazones, 2,6-dichloropyrimidine-4- or -5-carboxylic (or -sulphonic) acid halides, triazine halides such as cyanuric chloride, dihalomonophenylamino-sym.-triazines which may be further substituted in the phenyl nucleus, and pyrimidine tri- and tetrahalides. Of the halogides, the chlorides and bromides are of particular interest. These acylating agents are generally polyfunctional. The acylation reaction with polyfunctional acrylating agents of this type can be carried out in such a way that all or only some of the reactive groups or substituents are condensed with one or more mol of the amino group-containing dyestuff (II), optionally in the presence of another amino group-containing compound which may have a dyestuff character. If, after this condensation, there still remain reactive groups or substituents in the radical of the acylating component, then the dyestuffs can be used as reactive dyestuffs or they may be subjected to further reactions with primary or secondary amino compounds, hydroxy or mercapto compounds, these components being coloured or non-coloured.

Other very suitable polyfunctional acylating agents are, for example, phosgene, fumaric acid dichloride, chloro- or methyl-fumaric acid dichlorides, phthalic, terephthalic or isophthalic acid dichlorides, in this case disazo dyestuffs ($n=2$) preferably being desired and obtained.

Another method of producing the azo dyestuffs of the Formula I consists in that an amino monoazo dyestuff of the formula:

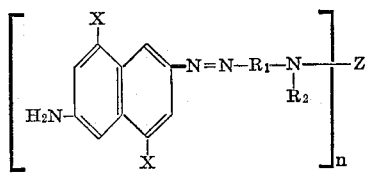

(III)

in which X, $R_1$, $R_2$, Z and $n$ have the same meaning as above, is diazotised, coupled in the o-position to the amino group, with a component:

R—NH$_2$ in which R represents an aromatic or heterocyclic radical, preferably a radical of the benzene or naphthalene series, and the resulting dyestuff triazolised in the usual manner. The aminoazo dyestuff (III) is produced, for example, by the reduction of a nitroazo dyestuff of the formula

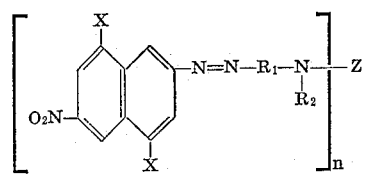

(IV)

The nitroazo dyestuff (IV) can be prepared from the corresponding amino-nitroazo dyestuff obtainable according to the instructions of German patent specification No. 1,079,760 by condensation with a suitable acylating agent. The triazolisation of the o-aminoazo compounds is carried out by known methods, for example, in an aqueous solution or suspension by the action of an ammoniacal CU(II) salt solution or of a sodium hypochlorite solution.

The new dyestuffs are valuable products which are eminently suited for the dyeing and printing of fibre materials containing hydroxyl and amide groups, e.g., for the dyeing of natural and regenerated cellulose, wool, silk and the like. The resulting dyeings, particularly those on cellulose fibre materials, are characterised by good fastness properties, especially good fastness to light. Those dyestuffs which contain reactive groups or substituents in the radical of the acylating agent are to be dyed or printed by the methods known for reactive dyeing on textile materials containing hydroxyl or amide groups, excellent dyeings, fast to wet processing being obtained.

In the following examples, which are given for the purpose of illustrating the invention, the parts are parts by weight if not otherwise stated.

EXAMPLE 1

0.1 mol of the monoazo dyestuff of the formula:

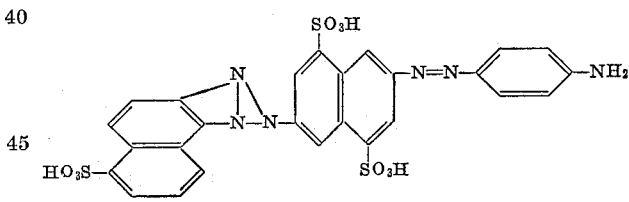

produced according to the instructions of the German patent specification No. 1,079,760, is dissolved neutral in 5000 parts hot water. The dyestuff solution is mixed at 10° C. with a solution of 7.7 parts fumaric acid dichloride in 140 parts by volume toluene and the mixture is kept neutral by the addition of a 20% sodium bicarbonate solution. When the reaction is completed, the dyestuff of the formula:

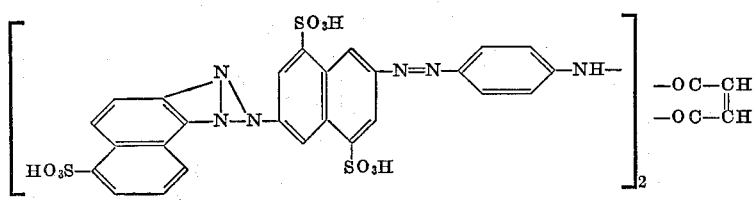

is salted out with sodium chloride, while hot, and isolated. The dried dyestuff is a dark powder which dissolves in water with a yellow colour and dyes cotton in clear yellow shades of good fastness to light and wet processing.

100 parts cotton are introduced at room temperature into a dyebath which contains 2 parts of the dyestuff, 2 parts sodium carbonate and 20 parts sodium sulphate, dissolved in 5000 parts by volume water. The dyebath is heated to 90° C. within about 30 minutes and kept at this temperature for a further 30 minutes. The dyed cotton is then rinsed and dried. A yellow dyeing is obtained.

If, instead of fumaric acid dichloride, the equivalent quantity of terephthalic acid dichloride is used as acylating agent, a dyestuff of the formula:

is precipitated, salting out with sodium chloride may be desired. The dyestuff dissolves in water with a yellow colour.

From the following table, further dyestuffs can be seen which are obtained from the triazole components given in the first column as amino-naphthalene-sulphonic acid, from the middle components set out in the second column and the acylating agents set out in the third column; the colour of the solution of the dyestuffs in water is specified in the fourth column.

| Triazole component aminonaphthalene-sulphonic acid | Middle component | Acylating agent | Shade in water |
| --- | --- | --- | --- |
| 2-aminonaphthalene-5-sulphonic acid. | 1-amino-3-methyl-benzene. | Fumaric acid dichloride. | Yellow. |
| Do | do | Terephthalic acid dichloride. | Do. |
| Do | do | Phosgene | Do. |
| Do | do | Phenyl isocyanate | Do. |
| Do | do | 3-chlorophenyl isocyanate. | Do. |
| Do | do | 4-chlorophenyl isocyanate. | Do. |
| Do | 1-amino-3-acet-amino-benzene. | Terephthalic acid dichloride | Do. |
| Do | do | Phosgene | Do. |
| Do | 1-amino-2-methoxy-5-methylbenzene. | do | Do. |
| Do | do | Terephthalic acid dichloride. | Do. |
| 2-aminonaphthalene-6-sulphonic acid. | do | do | Do. |
| Do | do | Phosgene | Do. |
| Do | do | Fumaric acid dichloride. | Do. |
| 2-aminonaphthalene-7-sulphonic acid. | 1-amino-3-methyl-benzene. | Phosgene | Do. |
| Do | do | Fumaric acid dichloride. | Do. |
| 1-aminonaphthalene-4-sulphonic acid. | do | do | Do. |
| Do | do | Terephthalic acid dichloride. | Do. |
| 2-aminonaphthalene-1-sulphonic acid. | do | do | Yellow (1:1). |

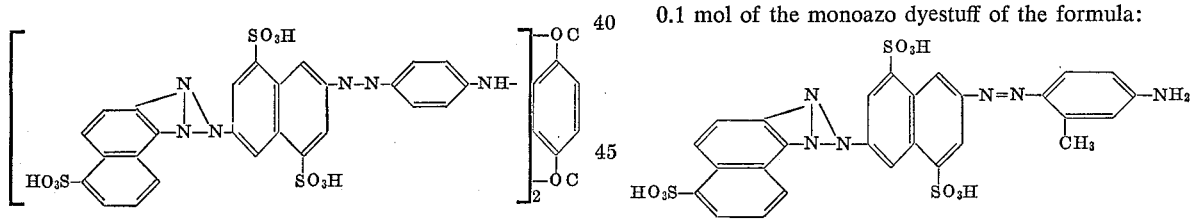

is obtained which dissolves in water with a yellow colour and dyes cotton in clear greenish yellow shades of good fastness to light.

If phosgene is passed into the solution of the initial amino-monoazo dyestuff at about 50° C. and a pH value of 6–7, while neutralising with a 20% sodium carbonate solution, the urea group-containing dyestuff of the formula:

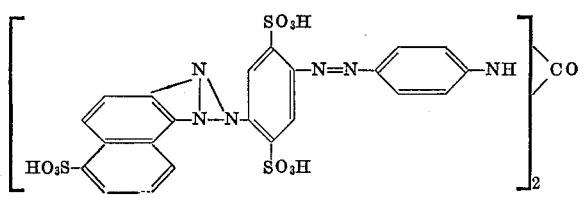

EXAMPLE 2

0.1 mol of the monoazo dyestuff of the formula:

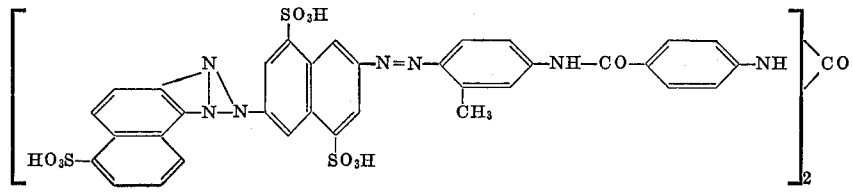

produced according to the instructions of German patent specification No. 1,079,760, is dissolved neutral in 5600 parts hot water and the solution mixed at about 40° C. with 19.5 parts 4-nitrobenzoyl chloride. The pH value is maintained at 6 to 6.5 by the addition of a 20% sodium carbonate solution. When the reaction giving the 4-nitrobenzoyl compound is completed, the product is salted out with sodium chloride at about 90° C. and isolated.

The dyestuff paste obtained is dissolved neutral in 12,000 parts by volume water and a solution of 50 parts crystalline sodium sulphide in 250 parts by volume water is added at 65° C. After reducing the nitro group to the amino group, the product is isolated in the usual manner, freed from precipitated sulphur by redissolving and again salted out and isolated.

The dyestuff paste obtained is dissolved in 14000 parts by volume water and converted at 60° C., while neutralising with a 20% sodium carbonate solution, by the introduction of phosgene into the urea group-containing dyestuff of the formula:

The dyestuff obtained is salted out, while hot, with sodium chloride in the usual manner, optionally adding pyridine, and isolated. After drying, a dark powder is obtained which dissolves in water with a yellow colour.

If, instead of phosgene, phenyl isocyanate is used for acylation, a dyestuff is obtained which dissolves in water with a yellow colour.

When starting from a monoazo dyestuff in which, instead of 1-amino-3-methylbenzene, there are used aniline or 1-amino-3-acetylaminobenzene or 1-amino-2-methoxy-5-methylbenzene as middle component, corresponding dyestuffs containing urea groups are obtained which dissolve in water with a yellow colour.

EXAMPLE 3

A solution of 0.1 mol of the monoazo dyestuff of the formula:

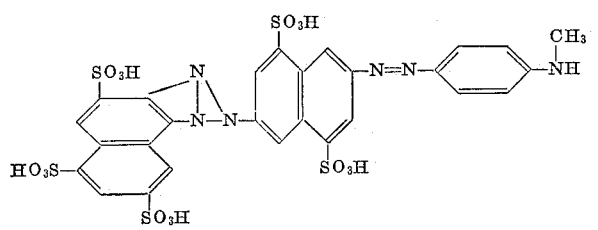

in 2200 parts by volume water (pH 6) is mixed at 40° C., while stirring, with the suspension of 30 parts 2,3-dichloroquinoxaline-6-carboxylic acid chloride in ice water containing a small quantity of a dispersing agent and the pH value is kept at 5 to 6 by the addition of a 20% sodium carbonate solution. When the reaction is complete, the dyestuff of the formula

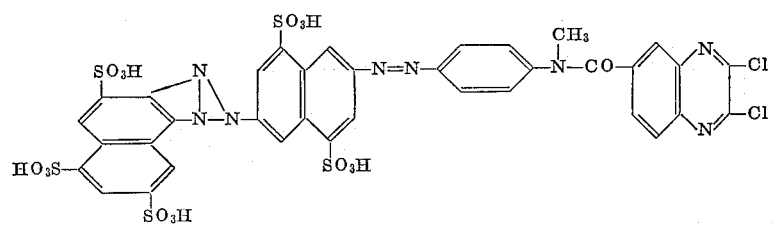

is isolated in the usual manner. After drying the dyestuff at 50° C. in a vacuum, it is a dark powder which dissolves in water with a yellow colour. The dyestuff dyes cotton by the process described below in yellow shades of good fastness to light, wet processing and chlorine:

168 ml. water at 20 to 25° C. are provided in a dye beaker of 300 ml. capacity placed into a heatable water bath. 0.3 gram dyestuff is intimately mixed with 2 ml. cold water to give a paste adding 30 ml. hot water (70° C.), and the dyestuff thus dissolves. The dyestuff solution is added to the water provided in the dye beaker, and 10 g. cotton yarn are continuously moved in this dyebath. The temperature of the dye liquor is raised to 40° C. within 10 minutes, 10 g. anhydrous sodium sulphate are added and dying is continued for 30 minutes. 4 grams anhydrous sodium carbonate are then added to the dyebath and dyeing is continued for 60 minutes at 40° C. The dyed material is then removed from the dyebath, the adhering liquor removed by wringing or squeezing and the material thoroughly rinsed, first with cold water and then with hot water until it does not bleed any longer into the rinsing liquor. The dyed material is subsequently soaped at boiling temperature for 20 minutes in 200 ml. of a liquor containing 0.2 g. sodium alkyl sulphonate, again rinsed and then dried at 60 to 70° C. in a drying cabinet.

EXAMPLE 4

0.1 mol of the monoazo dyestuff of the formula:

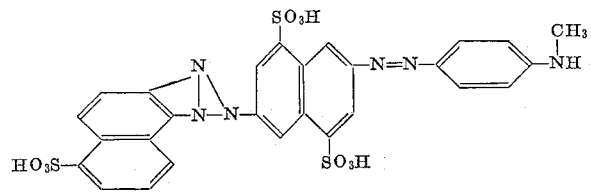

is dissolved in 1400 parts by volume water and 1750 parts dimethyl formamide (pH 6). A solution of 31 parts cyanuric chloride in 300 parts by volume acetone is added at 0° C. and the mixture maintained at pH 5–6 by the addition of a sodium acetate solution. When the reaction is completed, the dyestuff of the formula:

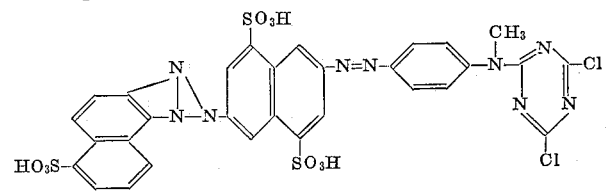

is salted out with sodium chloride and isolated. The dyestuff is dried in a vacuum and represents a dark powder which dissolves in water with a yellow colour. The dyestuff dyes cotton at room temperature according to the reactive dyeing method in clear greenish yellow shades.

If the dyestuff obtained according to the present Example is reacted at 40° C. and pH 5 to 6 with 1-aminonaphthalene-3,5,7-trisulphonic acid in the molecular ratio of 1:1, the dyestuff of the formula:

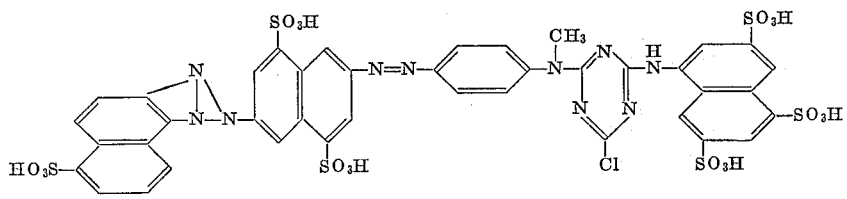

is obtained, which dissolves in water with a yellow colour and dyes cotton from a hot bath according to the reactive dyeing method in clear greenish yellow shades with good fastness to wet processing and chlorine.

Further dyestuffs can be obtained from the starting components set out in the following table, which have the colour of the solution in water specified in the column on the right hand side:

| Triazole component | Middle component | Acylating agent, reaction ratio 1:1 | Shade |
|---|---|---|---|
| 2-aminonaphthalene-5-sulphonic acid. | 1-amino-3-methyl-benzene. | Cyanuric chloride | Yellow. |
| 2-aminonaphthalene-3,6-disulphonic acid. | ....do.... | ....do.... | Do. |
| 1-aminonaphthalene-3,5,7-trisulphonic acid. | ....do.... | ....do.... | Do. |
| Do.... | ....do.... | 2,3-dichloro-quinoxaline-6-carboxylic acid chloride. | Do. |
| Do.... | ....do.... | 2,3-dichloro-quinoxaline-6-sulphonic acid chloride. | Golden yellow. |
| Do.... | ....do.... | 1-methoxy-3,5-dichloro-sym.-triazine. | Yellow. |
| 1-aminonaphthalene-4,6,8-trisulphonic acid. | N-methylaniline | 2,3-dichloro-quinoxaline-6-carboxylic acid chloride. | Do. |
| 1-aminonaphthalene-3,6,8-trisulphonic acid. | 1-amino-3-methyl-benzene. | ....do.... | Do. |
| Do.... | N-methylaniline | ....do.... | Do. |

We claim:
1. An azo dyestuff of the formula:

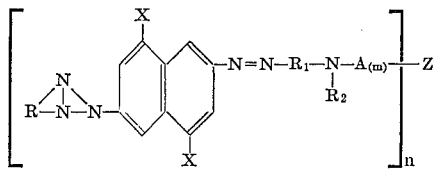

wherein R is a divalent radical having its free valences in the ortho-position and selected from the group consisting of naphthalene and naphthalene radicals substituted with up to 3 sulphonic acid groups; $R_1$ is a divalent radical having its free valences in the paraposition and selected from the group consisting of benzene and substituted benzene, wherein the substituents are methyl, methoxy or acetylamino; $R_2$ is hydrogen or methyl; X is sulphonic acid; n is 1 or 2; if n is 1, Z is 2,3-dichloro-quinoxoline-6-carbonyl, 2,3-dichloro-quinoxoline-6-sulphonyl, unsubstituted or halo-substituted alkyl carbonyl or -sulphonyl having up to 2 carbon atoms in the alkyl group, unsubstituted or halo-substituted alkylene-carbonyl or -sulphonyl having up to 3 carbon atoms in the alkylene group, 2,6-dihalopyrimidine-4 or -5-carbonyl or sulphonyl,

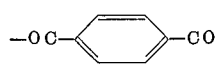

halo-triazinyl containing halo as the sole substituent, halomono phenyl sym. triazinyl having halo and phenyl as the sole substituents, or halo-pyrimidinyl containing halo as the sole substituent; wherein halo is chloro or bromo; and if n is 2, Z is —OC—CH=CH—CO—

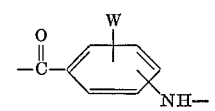

or

A is or

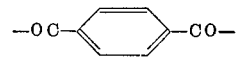

2. An azo dyestuff of the formula:

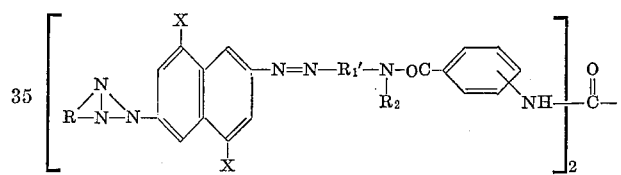

wherein R is a naphthalene radical substitued with up to 3 sulphonic acid groups; X is sulphonic acid; $R_1'$ is phenylene, sulpho phenylene, methyl phenylene, methoxy phenylene or methyl and methoxy substituted phenylene; $R_2$ is hydrogen.

3. An azo dyestuff of claim 1 of the formula:

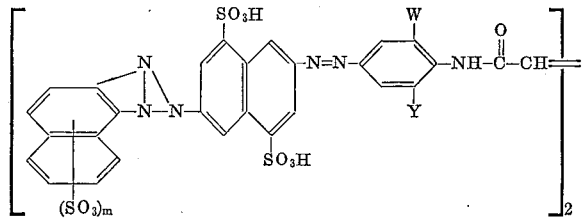

wherein m stands for an integer ranging from 1 to 2, Y stands for hydrogen or methyl and W stands for hydrogen or methoxy.

4. An azo dyestuff of claim 1 of the formula:

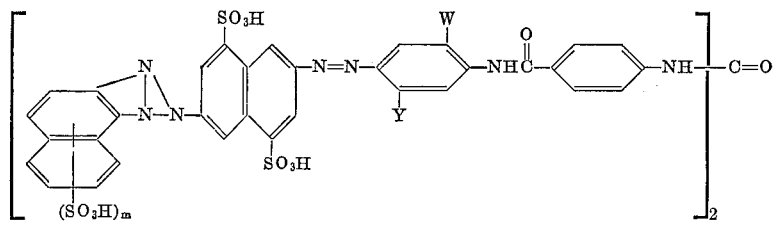

W is hydrogen or lower alkyl; m is 0 or 1; providing that when m is 1, Z is —CO—, —OC—CH=CH—CO wherein $m$ stands for an integer ranging from 1 to 2, Y stands for hydrogen or methyl and W stands for hydrogen or methoxy.

5. An azo dyestuff of claim 1 of the formula:

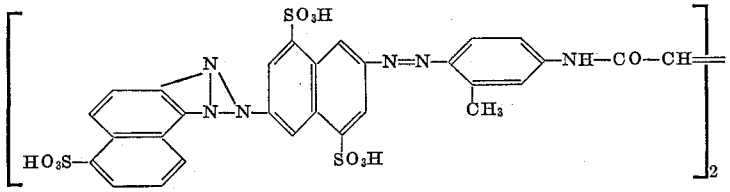

6. An azo dyestuff of claim 1 of the formula:

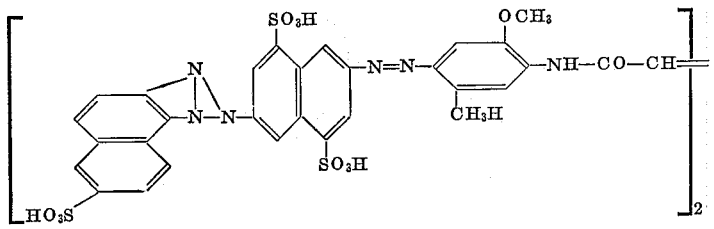

7. An azo dyestuff of claim 1 of the formula:

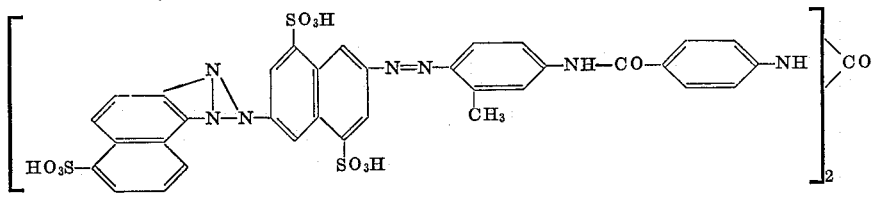

8. An azo dyestuff of claim 1 of the formula:

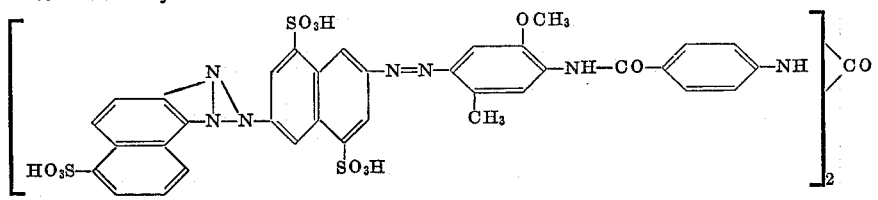

References Cited

UNITED STATES PATENTS 2,795,577    6/1957    Feeman _____ 260—153

FOREIGN PATENTS 1,079,760    4/1960    Germany.

CHARLES B. PARKER, Primary Examiner

D. M. PAPUGA, Assistant Examiner

U.S. Cl. X.R.

8—41, 51, 55; 260—153, 154, 194, 196

UNITED STATES PATENT OFFICE
CERTIFICATE OF CORRECTION

Patent No. 3,501,454　　　　　　　　　Dated March 17, 1970

Inventor(s) Horst Nickel and Fritz Suckfull

It is certified that error appears in the above-identified patent and that said Letters Patent are hereby corrected as shown below:

| Column | Line | Error |
|---|---|---|
| 2 | 16 | "dyestucs" should read ---dyestuffs--- |
| 10 | Claim 3 formula | " 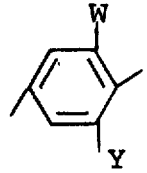 " should read --- 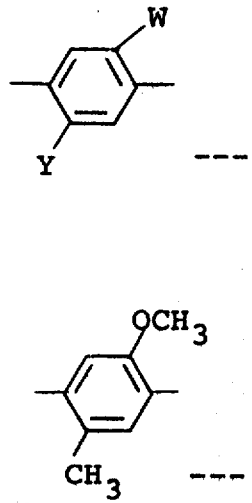 |
| 11 | Claim 6 formula | " 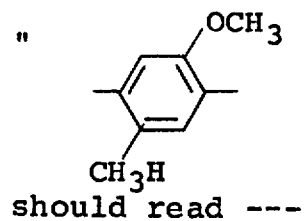 " should read --- |
| 4 | 18 | "CU (II)" should read ---Cu(II)--- |

Signed and sealed this 3rd day of November 1970.

(SEAL)
Attest:
EDWARD M. FLETCHER, JR.　　　　　　　WILLIAM E. SCHUYLER, JR.
Attesting Officer　　　　　　　　　　　Commissioner of Patents